May 27, 1930.  J. A. THOMAS  1,760,327
PILOT HEADLIGHT
Filed April 4, 1928
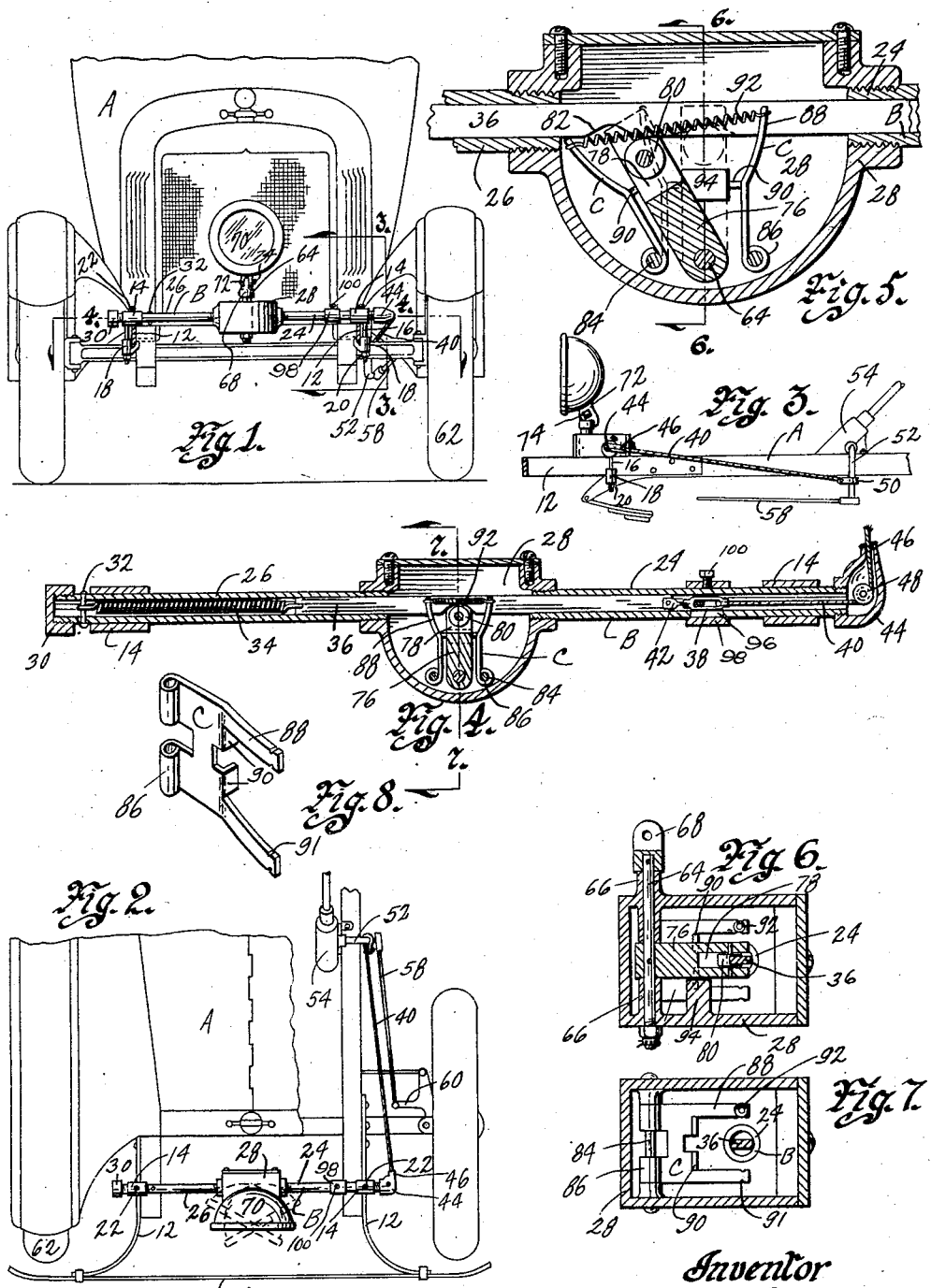
Witness
Vincent
Brown.
Inventor
James A. Thomas
by Bair & Freeman Attorneys.

Patented May 27, 1930

1,760,327

UNITED STATES PATENT OFFICE

JAMES ALFRED THOMAS, OF ALBERT LEA, MINNESOTA

PILOT HEADLIGHT

Application filed April 4, 1928. Serial No. 267,210.

The object of my invention is to provide a pilot head light for automobiles, the device itself being simple, durable and comparatively inexpensive in construction.

A further object is to provide a pilot head light of this character in the form of a unitary structure adapted to be attached to the forwardly extending supporting arms on an automobile bumper or to the chassis or other parts of the automobile itself.

A further object is to provide a light of this character in which means is provided for holding the lamp at a normally central position with the beam of light therefrom directed straight ahead of the car, the light being adapted for turning either to the right or left after a predetermined amount of steering movement has been imparted to the front wheels of the automobile, slight deviations from the straight ahead course of the automobile not affecting the turning of the light.

Still another object is to provide novel means of bringing the pilot light to central position whereby it is brought to a positive stopping point each time after being brought back from a right or left position.

Still a further object is to provide a device of the general description of the pilot head light shown and described in my Patent Number 1,650,402 issued November 22, 1927 but which is improved in appearance and mechanical details over the device shown in this patent.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a front elevation of an automobile illustrating my pilot light connected thereto.

Figure 2 is a plan view of the front of the automobile illustrating my device thereon, parts of the automobile being cut away to show the cooperation between various parts of the device and the automobile.

Figure 3 is a sectional view on the line 3—3 of Figure 1.

Figure 4 is an enlarged sectional view on the line 4—4 of Figure 1.

Figure 5 is an enlarged view of the central portion of Figure 4 showing the parts in a different position.

Figure 6 is a perspective view of one of the arms for holding the lamp at a central position.

Figure 7 is a sectional view on the line 7—7 of Figure 5; and

Figure 8 is a sectional view on the line 8—8 of Figure 4.

On the accompanying drawings, I have used the reference character A to indicate generally an automobile. Most automobiles are now provided with bumpers and in connection with the automobile A, I illustrate a bumper bar 10. The bar 10 is supported by supporting arms 12 which extend from the bumper bar to the automobile and are connected to the frame thereof.

My pilot light comprises a tube B in which the operating parts of my device are mounted. The tube B is secured to the supporting arms 12 in the following described manner. A hub 14 is rotatably and slidably mounted on the tube B adjacent each supporting arm 12. The hub 14 is adapted to rest on top of the supporting bar. A bolt 16 is secured to the hub 14 and extends downwardly therefrom. A hook member 18 is positioned on the bolt 16 and is held up against the under edge of the arm 12 by a nut 20.

It will be obvious that tightening of the nut will draw the hub 14 down against the top of the arm 12 and with an attaching device of this character at each end of the tube B, the tube is securely positioned on the arms 12. Set screws 22 are provided for holding the tube B within the hubs 14.

From the foregoing description, it will be obvious that my device may be fitted to a variety of supporting arms 12, the hubs 14 being capable of adjustment toward or away from each other, the nuts 20 providing for arms of various widths. The tube B may be rotated to any desired position with respect to the automobile and held there by set screws 22.

The tube B comprises two portions 24 and 26 which are screwed into a control housing 28. The control housing in this manner serves to rigidly connect the two portions 24 and 26 together. The outer end of the portion 26 of the tube B is covered by a cap 30. A pin 32 extends through the portion 26 and a spring 34 is hooked onto this pin. One end of a bar 36 is connected to the spring 34 and extends from the portion 26 of the tube B through the housing 28 and into the portion 24 of the tube B.

A turn buckle 38 is swivelly connected to the cable 40 and is connected by a threaded rod 42 to the bar 36. On the outer end of the portion 24, a cap 44 is provided. This cap has a backwardly extending tubular portion 46 and inside the cap a pulley 48 is rotatably mounted. The cable 40 extends around the pulley 48 and out of the portion 46 of the cap 44. The end of the cable 40 is connected by a clamp 50 to the steering arm 52 of the automobile.

The steering arm 52 is actuated by gearing within the housing 54 and this gearing in turn is actuated by the steering wheel of the automobile. The steering arm 52 is connected by a link 58 to the steering arm 60 on one of the front wheels 62 of the automobile. This is the ordinary construction of automobiles and I utilize the steering arm 52 for the purpose of actuating my pilot light.

A shaft 64 is rotatably mounted in bosses 66 formed on the housing 28. This shaft has a bracket 68 secured to its upper end and a lamp 70 having a lug 72 is secured to the bracket 68 by a clamping bolt 74. The clamping bolt 74 allows for adjustment of the lamp 70 to throw the beam of light upwardly or downwardly as desired.

Within the housing 28 a lever 76 is secured to the shaft 64. The lever 76 has a slot 78 through which the bar 36 is slidably mounted. The slot 78 serves to prevent rotation of the bar 36 in the tube B. A roller 80 is journaled in the slot 78 and is adapted to coact with one edge of the bar 36.

As indicated in Figures 4 and 5 of the drawings, a notch 82 is provided in the bar 36 and this notch is somewhat wider than the roller 80 and is normally in line with this roller when the car maintains a straight course. By being wider than the roller, the notch allows slight movement of the bar 36 without affecting the lever 76. However, when a corner is turned by the automobile, the notch 82 engages the roller 80 and swings the lever 76 to the full line position illustrated in Figure 5 providing the front wheels have been turned enough.

After a predetermined amount of turning of the front wheels, the roller 80 will leave the notch 82 and ride upon the edge of the bar 36 as shown in this figure. In this way the lamp is turned a predetermined amount and then no matter how much further the front wheels are turned, the lamp will stay in this same position.

In my Patent Number 1,650,402, I disclosed a pair of springs for holding the lever 76 in a neutral or central position. However, I have found that after some use one of the springs will become weaker than the other one and the lamp will in time be maintained in a noncentral position. To overcome this tendency and provide a positive means for always bringing the lever 76 to central position, I provide the following described mechanism.

Pivot pins 84 are mounted in the housing 28 and on these pins, I mount a pair of arms C. The arm C include looped portions 86 extending around the pins 84. Fingers 88 are provided on the arms C and the arms have projections 90 formed on them. Notches 91 are formed in the fingers 88 for the purpose of securing a spring 92 from a finger on one arm to a finger on the other one. A stop 94 is provided which extends up from the bottom of the housing 28 and the spring 92 tends to hold the projections 90 against the stop.

If desired, two of the springs 92 may be used whereby the two fingers on one arm are connected to the two fingers on the other one. The lever 76 extends from the shaft 64 between the projections 90 and then to the bar 36. The stop 94 and the lever 76 are equal in width or arranged so that normally the arms C are against the stop 94 and also against the sides of the lever 76. This causes a positive position to be normally maintained by the lever 76.

In the operation of my device it will be obvious that the bar 36 in moving one way or the other, moves the lever 76 with it. When the lever 76 is moved to the right as illustrated in full lines in Figure 5, the left hand arm C will be moved against the tension of the spring 92 but the right hand arm C will remain against the stop 94.

When the bar 36 moves in an opposite direction, the right hand arm C will be moved away from the stop and the left hand arm will remain against the stop. In either event, the spring 92 will be placed under greater tension and will serve to bring the lever 76 back to a central position. This position will always be normally maintained regardless of whether or not the spring 92 is strong or weak.

The turnbuckle 38 is placed between the cable 40 and the bar 36 for the purpose of providing an adjustment whereby the position of the said bar may be regulated so as to center the notch 82 relative to the lever 76 and roller 80. It is desirable to place this turnbuckle within the tube 24 to protect it and to provide against accidental disarrangement of the adjustment. To afford access to the turnbuckle 38, the tube 24 is formed with a notched opening 96 which is normally covered by a sleeve 98 embracing the tube and held in place by a set screw 100.

Some changes may be made in the construction and arrangment of the parts of my device without departing from the real spirit and purpose of my invention, and it is my intention to cover by my claims, any modified forms of structure or use of mechanical equivalents, which may be reasonably included within their scope.

I claim as my invention:

1. A pilot light comprising a tube, means for mounting said tube on an automobile, a control housing associated with said tube, a bracket oscillatably mounted on said housing, a lamp on said bracket, means within said housing for oscillating the bracket, a cable connected with said last mentioned means, extending from one end of the tube and connected to the steering arm of the automobile, an adjusting member in said tube connected with said cable for controlling the position of the oscillating means relative to the bracket, a notch in said tube adjacent the connection of the cable to the last mentioned means for affording access to said adjusting member, and a sleeve normally covering said notch.

2. In a device of the class described, a lamp, a shaft for supporting said lamp, a lever associated with said shaft, means for oscillating said lever and means for normally holding the lever at a central position, said means comprising a pair of pivoted arms arranged one on each side of said lever, a single spring connecting the free ends of said arms for resiliently holding said arms toward each other and against said lever, and a stop to normally maintain the arms at a predetermined position.

3. In a device of the class described, a lamp, a shaft, for supporting said lamp, a lever associated with said shaft, means for oscillating said lever, and means for normally holding the lever at a central position comprising a pair of pivoted arms, a stop, and a spring connected only to said arms, at the free ends thereof, for normally holding said arms against said stop, said arms arranged for being selectively engaged by said lever when it is moved from its central position, the other arm at such times being held by said stop whereby power is stored in said spring for returning the lever to central position.

4. In combination with a lever oscillatably mounted, a pair of pivoted arms, a spring for resiliently connecting said arms whereby they are constrained to move toward each other, said lever being confined between said arms, and a rigidly arranged stop for limiting the movement of said arms toward each other, and for holding one arm immovable when the other is moved in one direction by said lever, whereby power is stored in said spring for returning said lever to normal position.

Des Moines, Iowa, March 16, 1928.

JAMES ALFRED THOMAS.